(12) United States Patent
Gill

(10) Patent No.: US 6,293,025 B1
(45) Date of Patent: Sep. 25, 2001

(54) METHOD FOR VERIFYING AND MEASURING DOUBLE-TOOTHING SPROCKET WHEELS AND DEVICE FOR CARRYING OUT THE METHOD

(75) Inventor: Sheridan Ralph Gill, Sark (GB)

(73) Assignee: Technologies Reasearch Holding S.A., Luxembourg (LU)

( * ) Notice: Subject to any disclaimer, the term of this patent is extended or adjusted under 35 U.S.C. 154(b) by 0 days.

(21) Appl. No.: 09/566,610

(22) Filed: May 9, 2000

Related U.S. Application Data

(63) Continuation of application No. PCT/GB98/03297, filed on Nov. 4, 1998.

(30) Foreign Application Priority Data

Nov. 12, 1997 (GB) .................................................. 9723915

(51) Int. Cl.⁷ ...................................................... G01B 5/16
(52) U.S. Cl. ..................................... 33/501.14; 33/501.15
(58) Field of Search ............................... 33/501.7, 501.8, 33/501.9, 501.11, 501.12, 501.13, 501.14, 501.15, 501.16, 501.17, 501.18, 501.19; 73/162

(56) References Cited

U.S. PATENT DOCUMENTS

| | | | | |
|---|---|---|---|---|
| Re. 22,953 | * | 12/1947 | Praeg ................................. | 33/501.16 |
| 3,508,337 | * | 4/1970 | Reef .................................. | 33/501.17 |
| 3,774,313 | * | 11/1973 | Occhialini et al. ............... | 33/501.19 |
| 4,276,699 | | 7/1981 | Sterki et al. ..................... | 33/501.7 |
| 4,769,917 | | 9/1988 | Bertz et al. ...................... | 33/501.9 |

FOREIGN PATENT DOCUMENTS

| | | |
|---|---|---|
| 37 17 666 A1 | 12/1988 | (DE) . |
| 2 463 391 | 2/1981 | (FR) . |
| 57 106801 | 7/1982 | (JP) . |
| 02 168101 | 6/1990 | (JP) . |
| 06 160243 | 6/1994 | (JP) . |

\* cited by examiner

*Primary Examiner*—Diego Gutierrez
*Assistant Examiner*—R. Alexander Smith
(74) *Attorney, Agent, or Firm*—Akin, Gump, Strauss, Hauer & Feld, L.L.P.

(57) ABSTRACT

Method and device for verifying and measuring a double-toothing sprocket wheel (14) to identify the respective positions of the teeth (24) of the two toothed rings (27a, 27b) thereof, in which method use is made of a pair of contacting elements, a first lower (23a) and a second upper (23b) contacting elements which lie in different parallel planes, the contacting elements cooperating respectively with one groove (25) of the first ring (27a) and one groove (25) of the second ring (27b), in which method a first contacting element (23a) is constrained to lie in a position which is fixed radially with respect to the longitudinal axis (17) of the sprocket wheel (14), and the second contacting element (23b) is progressively displaced in a radial direction with respect to the longitudinal axis (17) of the sprocket wheel (14) until it reaches a position of maximum possible advance, the position of maximum advance being compared with a reference position to establish a condition of alignment between the terminal ends (123) of the two contacting elements (23a, 23b).

16 Claims, 2 Drawing Sheets

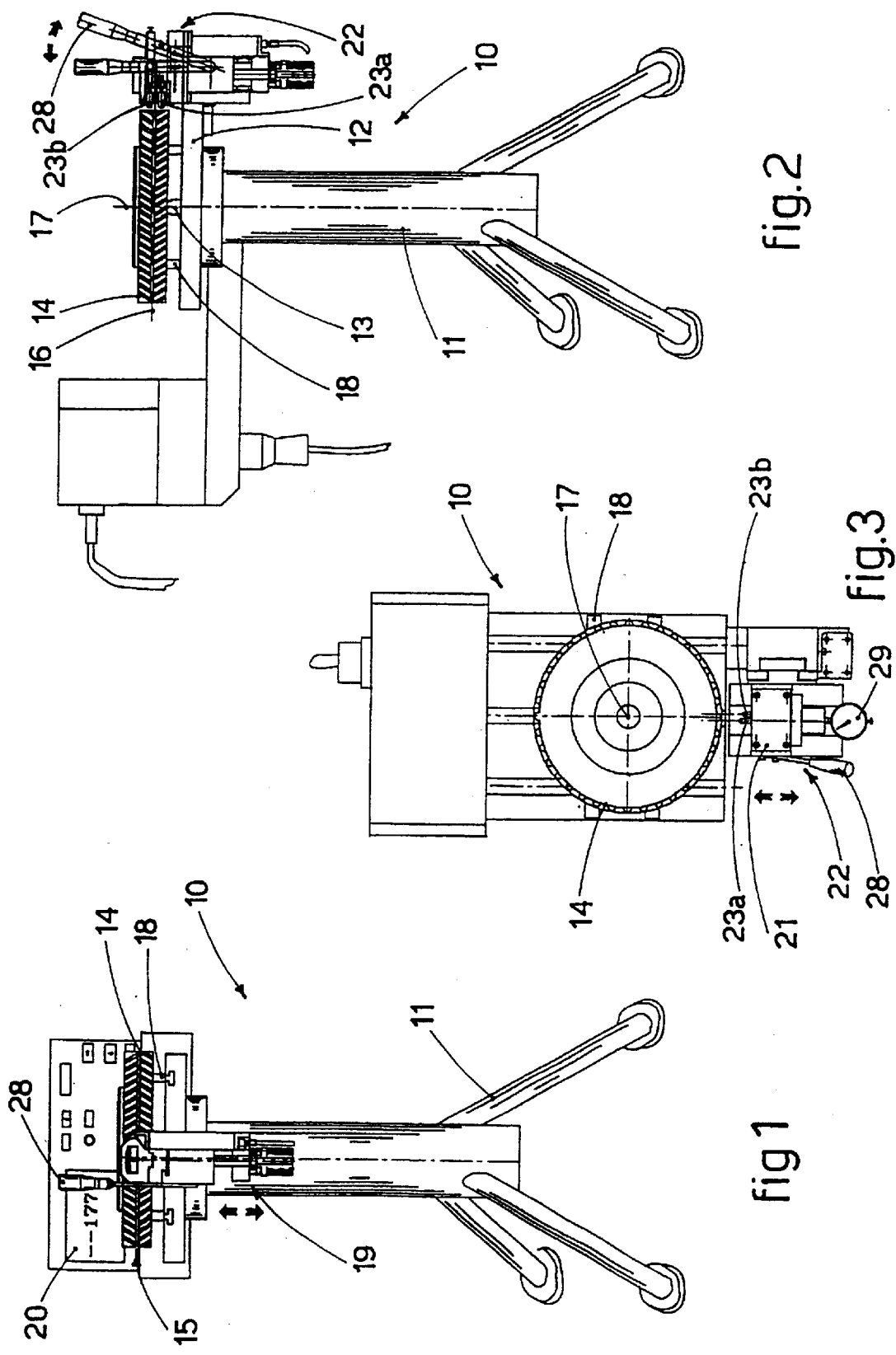

METHOD FOR VERIFYING AND MEASURING DOUBLE-TOOTHING SPROCKET WHEELS AND DEVICE FOR CARRYING OUT THE METHOD

CROSS REFERENCE TO RELATED APPLICATION

This Application is a continuation of International Application PCT/GB98/03297, filed Nov. 4, 1998, the disclosure of which is incorporated herein by reference.

BACKGROUND OF THE INVENTION

This invention concerns a method for verifying and measuring a double-toothing sprocket wheel, and to a device for carrying out the method.

The invention is concerned with the production of sprocket wheels, or pulleys for drive belts, with a straight or bi-helical double-toothing.

The sprocket wheel or pulleys to which the invention refers are advantageously of the type used together with so-called positive drive belts such as those produced by the Goodyear Company and known by the trade name of "Eagle".

The invention seeks to enable the accuracy of the respective positionings of the teeth of two toothings to be verified and enable sprocket wheels with extremely high mechanical characteristics to be produced.

The sprocket wheels to which the invention relates may include teeth which coincide with a center line or are offset, the offset distance being advantageously 50% of the pitch.

SUMMARY OF THE INVENTION

The state of the a sprocket wheels with a straight or bi-helical double-toothing. The latter comprise two coaxial rings of oblique and converging teeth, arranged substantially symmetrically with respect to an intermediate plane of separation, substantially in a herringbone design.

Depending on the shape of the teeth, the sprocket wheels may be used to transmit movement by means of positive drive belts.

In this type of sprocket wheel it is well known that the relative position of the two rings must conform with the utmost precision to that of the intended design, so as to guarantee the absolute coincidence of the positions of the teeth of the two rings. This is so that the sprocket wheel can collaborate with the utmost efficiency in transmitting movement, whether engaging with a mating sprocket wheel or being associated with a double-toothing drive belt.

It becomes ever more important to verify the respective positions of the two toothed rings quickly and easily when they are made separately in two successive steps and the partly worked pieces are transferred from one machine to another. Traditional systems which have been proposed until now, even in those rare cases where they have found a practical application, on the one hand lack speed, simplicity and economy of use, and on the other hand are not able to ensure with the required precision the minimum tolerances such as will guarantee that high quality products with optimum mechanical characteristics will be obtained. One such system is that according to FR-A-2463391 which makes use of a pair of contacting elements.

An object of this invention is to provide a simple solution, which is efficient, quick, and economical, and will guarantee extremely precise results in respect of the correct positioning of the two toothed rings in a double-toothing sprocket wheel.

This invention is set forth and characterized in the respective independent claims, while the dependent claims describe variants of the idea of the main embodiment.

The invention will be described hereinafter with respect to one of its uses on bi-helical double-toothing sprocket wheels in a herringbone design, with the teeth oblique and converging towards the median plane of the sprocket wheel, and the two toothed rings being separated by a central groove. More particularly, the invention will be described with reference to a situation where the device comprises a horizontally disposed support on which the worked sprocket wheel is arranged with its axis orthogonal to the supporting plane. The invention is however readily transferable to devices lying in a vertical or an oblique plane, or to different types of sprocket wheel. The invention may be used, in particular, with two toothed rings, made in two different steps, which are concentric and whose relative pitch circles coincide. In preferred practice the offset distance between the teeth of one ring with respect to the teeth of the other ring is 50% of the pitch.

The invention may be used on a bi-helical sprocket wheel which has already been worked and is associated with a support device.

According to the invention, the verification and measuring device comprises a supporting assembly including a first waiting position remote from the finished sprocket wheel and a second working position near the sprocket wheel. According to one embodiment, the support for the sprocket wheel can be moved towards the supporting assembly. According to a variant, the supporting assembly can be moved with respect to the support. Either such displacement can be termed "radial" to indicate a relationship to the longitudinal axis of the sprocket wheel to be verified and lying on its support. Indeed, according to another variant, both the supporting assembly and the support are reciprocally movable in a direction radial to the longitudinal axis of the sprocket wheel.

At least two contacting elements, arranged on relative horizontal planes, are mounted on the support.

In another embodiment of the invention, the contacting elements extend substantially orthogonally to the longitudinal axis of the sprocket wheel. The terminal ends of the contacting elements face the sprocket wheel and are arranged so as to cooperate with one of the grooves defined between two adjacent teeth of the two toothed rings.

The horizontal positioning planes of the two contacting elements are such that a first contacting element can cooperate, in the working position, with the teeth of a first toothed ring, while the other contacting element can cooperate with the teeth of the second toothed ring.

According to a variant, the supporting surface for the sprocket wheel is vertically movable and can be adjusted in height so as to define a precise position so that the median plane of the sprocket wheel coincides, during the working step, with the median plane of separation between the two contacting elements for all diameters of the sprocket wheel.

According to another variant, at the beginning of the working step, the support for the sprocket wheel is fixed in position and the assembly supporting the two contacting elements is displaced vertically so as to align the median plane of the two contacting elements.

According to another variant, at least one of two contacting elements can be moved vertically with respect to the other contacting element.

The terminal ends of the contacting elements, in one embodiment, are rounded or curved. According to a variant, the terminal ends of the contacting elements are spherical. According to the invention, the vertical planes containing the longitudinal axes of the two contacting elements are offset according to the alignment, that is the staggering, of the teeth of the toothed rings.

In the situation dealt with hereinafter as an example, therefore, the offset distance between the vertical planes containing the contacting elements is 50% of the pitch, the pitch being the distance between two adjacent teeth of the toothed rings.

According to the invention, moreover, one of the two contacting elements has a radially fixed and defined position with respect to the supporting assembly while the other contacting element is displaceable, with respect to the supporting assembly, in a direction radial to the axis of the sprocket wheel.

According to the invention, during the verification step the displaceable support takes up a working position radially near the periphery of the sprocket wheel until the terminal end of the first fixed contacting element cooperates with a desired groove of the sprocket wheel. The second contacting element is arranged in a retracted position with respect to the first contacting element. The median plane of the sprocket wheel is moreover aligned precisely with the median plane of separation between the two contacting elements.

According to a variant, the sprocket wheel is not made to lie directly on a supporting base, but on supporting guides which define precisely a horizontal plane of reference.

When the first radially fixed contacting element, associated with the first ring, is located inside the groove between two teeth, a linear measuring assembly associated therewith defines a precise and defined radial position of reference, or zero position. Advantageously, the terminal ends of the contacting elements are shaped so that the point of maximum radial advance allowed should coincide with the pitch circle of the teeth of the toothed rings.

Then, the second contacting element associated with the second ring is displaced radially, so that its terminal end part shall be located inside the groove defined between two teeth of the second ring. Displacement takes place as far as is allowed.

In this position, a comparator associated with the second contacting element compares the position of the second contacting element and the position of reference defined by the first contacting element. In this way the comparator can immediately supply an indication of the respective positions of the two rings, verifying the correct radial position of the two contacting elements, or can supply an indication of error if the second contacting element is displaced to a greater or lesser radial extent with respect to the zero position. A display associated with the comparator can supply the operator with an immediate indication, with a plus or minus sign according to the extent of the deviation from the zero position.

The invention not only verifies the respective positions of the toothings, it can provide measurement of the real extent of the staggering, by using a table in which the reading taken by the display showing the deviation between the two contacting elements is transformed into a measurement of the angular or circumferential staggering between the teeth of the toothings.

BRIEF DESCRIPTION OF THE SEVERAL VIEWS OF THE DRAWINGS

The attached Figures are given as a non-restrictive example, and show a preferential embodiment of the invention as follows:

FIGS. 1, 2 and 3 show respectively from the front, the side and from above the verification device for double-toothing sprocket wheels according to the invention;

DETAILED DESCRIPTION OF THE INVENTION

Figure 5A:
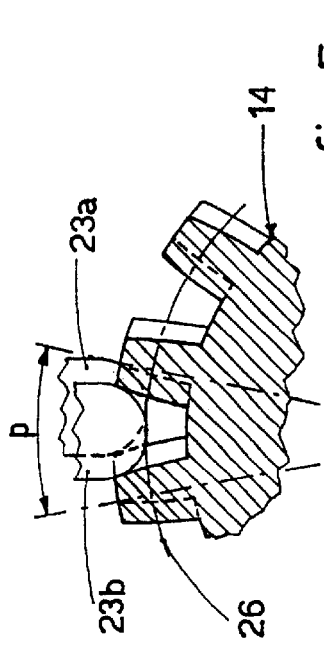
FIGS. 5a, 5b and 5c show the device from FIGS. 1–3 from above and three possible situations.

The verification device 10 shown in the attached figures comprises a supporting tripod 11 supporting a planar surfaced support 12 equipped with a vertical pin 13 to position a sprocket wheel 14. The sprocket wheel 14 is of a type having bi-helical double-toothing with a central groove 15 defining a median plane 16 thereof.

The sprocket wheel 14 is arranged with its longitudinal axis 17 orthogonal to the aforesaid planar surface. The sprocket wheel 14 rests on two guide elements 18 which can be steel bars 18 and which define a correct horizontal reference plane. In this case, the height of the planar supporting surface can be adjusted so as to set the vertical reference position of the sprocket wheel 14 which is defined according to its diameter. To adjust the height of the supporting planar surface of support 12, a height adjusting assembly 19 is provided which is associated with a measuring instrument 20 which visually displays the value of the vertical position of the median plane 16 of the sprocket wheel 14.

The verification device 10 comprises a verification assembly 22 including a supporting assembly 21 on which two contacting elements are mounted, a first contacting element 23a and a second contacting element 23b arranged in different horizontal planes astride the median plane 16 of the sprocket wheel 14. The first, lower, contacting element 23a cooperates with a lower toothed ring 27a and the second upper contacting element 23b cooperates with the upper toothed ring 27b. The vertical distance between the two contacting elements 23a, 23b has a predetermined value which is a function at least of the pitch "P" of the sprocket wheel 14 and the inclination of the teeth 24 thereof. Because of the type of sprocket wheel 14 shown, the two contacting elements 23a and 23b are arranged in different vertical planes (see FIG. 3) with an offset distance of 50% of the pitch with respect to the teeth 24 of the sprocket wheel 14.

The free terminal end 123 of each contacting element 23a, 23b is rounded, advantageously semi-spherically, so that each can adapt to the shape of the groove 25 between two adjacent teeth 24 and come into contact with the walls of the teeth 24. At the point of maximum advance, the terminal end 123 is located substantially in contact with the pitch circle 26 of the sprocket wheel 14. The first lower contacting element 23a is radially fixed with respect to the axis 17 of the sprocket wheel 14, while the second upper contacting element 23b is radially displaceable. According to a variant, either or both of the contacting elements 23a or 23b can be displaced vertically.

The supporting assembly 21 is associated with means for radially displacing the sprocket wheel 14 with respect to the axis 17, in this case an articulated or multiplier command handle 28. According to a variant, the radial displacement means is automatic or in any case can be automatically activated.

During the verification of the respective positions of the teeth 24 of the two toothed rings 27a, 27b, first of all the position of the plane containing the central plane of the two contacting elements 23a, 23b is adjusted, so that it coincides precisely with the median plane 16 of the sprocket wheel 14. This adjustment can be made either by displacing vertically the supporting assembly of the contacting elements 23a, 23b, or by displacing one of the two contacting elements with respect to the other, or by displacing the supporting plane of the sprocket wheel 14 with respect to the contacting elements which are kept stationary. Then, the sprocket wheel 14 is displaced towards the supporting assembly 21, with the second contacting element 23b arranged in a radially retracted position, until the terminal end 123 of the first, lower, fixed contacting element 23a enters the groove 25 of the first ring 27a of the sprocket wheel 14, as far as the position of maximum advance, in this case coinciding with the pitch circle 26.

The radial position of the first lower contacting element 23a, which is associated with a linear displacement measurer, defines the zero position which is taken as a reference position by a comparator assembly associated with the second, upper, contacting element 23b.

Then, the upper contacting element 23b is displaced towards the sprocket wheel 14 until its terminal end is located inside a groove 25 of the upper toothed ring 27b, as far as the position of maximum radial advance. The comparator then compares the position of the second, upper, contacting element 23b with respect to the reference position defined by the first lower contacting element 23a and uses means 29 to display the extent of any deviation.

Figure 5B:
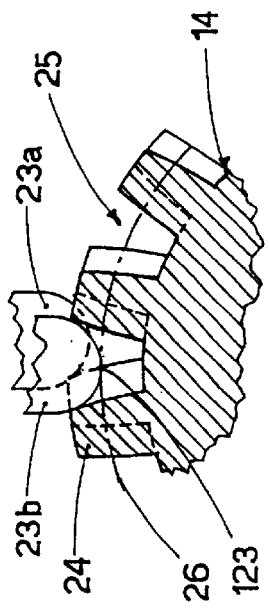
Figure 5C:
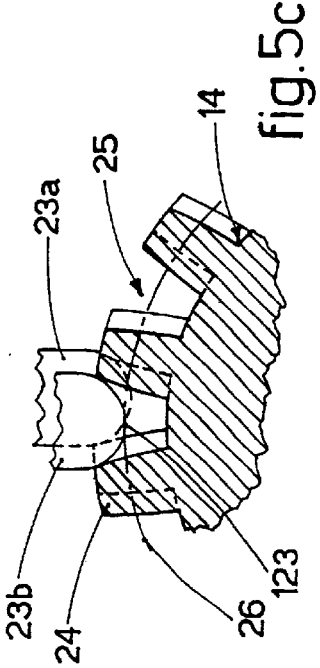
Figure 4:
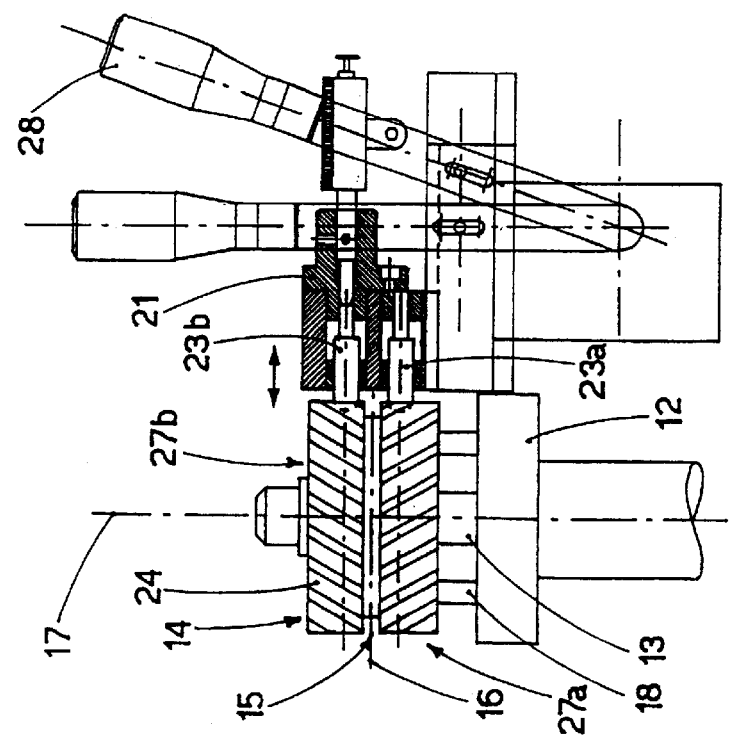
FIG. 4 shows an enlarged detail of FIG. 2.

In this case, there are three possible situations:
there is a perfect alignment in a vertical plane of the terminal ends 123 of the two contacting elements 23a 23b (FIG. 5a): the display 29 will indicate 0 and the sprocket wheel 14 will be judged acceptable;

the second, upper, contacting element 23b will be further forward than the first, lower, contacting element 23a (FIG. 5b): the display 29 will indicate a deviation with a minus sign and the sprocket wheel 14, if the deviation is above an allowed tolerance, will be judged unacceptable;

the second, upper, contacting element 23b is further back than the first lower contacting element 23a (FIG. 5c); the display 29 will indicate a deviation with a plus sign and the sprocket wheel 14, if the deviation is above an allowed tolerance, will be judged unacceptable.

The measurement shown on the display 29 can be used, if the appropriate conversion tables are available, to measure the magnitude of the angular or circumferential deviation between the teeth 24 of the two toothed rings 27a, 27b.

What is claimed is:

1. Method for verifying and measuring a double-toothing sprocket wheel (14) to identify the respective positions of the teeth (24) of the two toothed rings (27a, 27b) thereof, the sprocket wheel (14) having straight or bi-helical double-toothing and the teeth (24) of the two toothed rings (27a, 27b) being aligned or offset, the sprocket wheel (14) being arranged on a support (12), in which use is made of a pair of contacting elements, respectively a first lower element and a second upper element, characterized in that said first, lower (23a) and said second, upper (23b) contacting elements lie in different parallel planes, the said contacting elements being capable of cooperating respectively with one groove (25) of the first ring (27a) and one groove (25) of the second ring (27b) and the median plane (16) of the sprocket wheel (14) being aligned with a plane central to the planes in which the contacting elements (23a, 23b) lie, in which the first contacting element (23a) is constrained to lie in a position which is fixed radially with respect to the longitudinal axis (17) of the sprocket wheel (14), as a reference position, and the second contacting element (23b) is progressively displaced in a radial direction with respect to the longitudinal axis (17) of the sprocket wheel (14) until said second contacting element reaches a position of maximum possible advance, the position of maximum advance then being compared with the reference position defined by the first contacting element (23a) to establish a condition of alignment between terminal ends (123) of the two contacting elements (23a, 23b), with the sprocket wheel (14) being found acceptable or unacceptable because of negative or positive misalignment, indicating a defect in the sprocket wheel (14).

2. Method as in claim 1, in which, in a preliminary step, the sprocket wheel (14) is radially displaced towards the contacting elements (23a, 23b).

3. Method as in claim 1, in which, in a preliminary step, the contacting elements (23a, 23b) are radial displaced towards the longitudinal axis (17) of the sprocket wheel (14).

4. Method as in claim 1, in which the support (12) is adjusted to achieve the alignment of the median plane (16) of the sprocket wheel (14) and the plane central to the contacting elements (23a, 23b), and the value of the adjacent is displayed.

5. Method as in claim 1, in which at least one of the two contacting elements (23a, 23b) is displaced in a plane which contains them both and which is orthogonal to said parallel planes to achieve the alignment of the median plane (16) of the sprocket wheel (14) and the plane central to the contacting elements (23a, 23b).

6. Method as in any claim hereinbefore, in which, in the position of maximum advance, the terminal end (123) of the first contacting element (23a) lies on the pitch circle (26) of the sprocket wheel (14).

7. Method as in claim 1, in which an extent of deviation between the two contacting elements (23a, 23b), which is said condition of alignment, is expressed as a value of measurement of an angular or a circumferential staggering by means of appropriate conversion tables.

8. Device for verifying and measuring a double-toothing sprocket wheel to verify the respective positions of the teeth (24) of two toothed rings (27a, 27b) of the sprocket wheel (14) with a straight or bi-helical double-toothing, the teeth (24) of the two toothed rings (27a, 27b) being aligned or offset, the device comprising a support (12) for the sprocket wheel (14) and at least two contacting elements respectively a first lower element and a second upper element, the device being characterized in that it comprises a verification assembly (22) including a supporting assembly (21) displaceable radially with respect to the sprocket wheel (14), the supporting assembly (21) supporting the at least two said contacting elements, the first lower contacting element (23a) and the second upper contacting element (23b) arranged in two planes parallel to each other astride the median plane (16) of the sprocket wheel (14), respective terminal ends (123) of the contacting elements (23a, 23b) facing towards the position occupied, in use, by the periphery of the sprocket wheel (14) and shaped so as to cooperate with the grooves (25) defined between two adjacent teeth (24) of the toothed rings (27a, 27b), one of the two contacting elements (23a) being fixed radially with respect to the sprocket wheel (14), in use, for cooperating with a groove (25) of one of the toothed rings (27a), the other contacting element (23b) being radially displaceable with respect to said sprocket wheel (14) to progressively approach a position wherein it cooperates with a groove (25) of the other toothed ring (27b), the device additionally including comparator means to compare the position of maximum radial advance of the second contacting element (23b) with respect to a reference position of the first contacting element (23a) to determine an extent of any deviation.

9. Device as in claim 8, in which the support (12) has associated guide and supporting means (18) defining a level position of reference of the sprocket wheel (14).

10. Device as in claim 8, in which the support (12) has associated position adjustment means (19) associated with display means (20).

11. Device as in claim 8, in which the terminal end (123) of the contacting elements (23a, 23b) is at least partly rounded or curved.

12. Device as in claim 11, in which the terminal end (123) of the contacting elements (23a, 23b) is substantially spherical.

13. Device as in claim 8, in which the first contacting element (23a) is associated with a measuring device to measure the radial displacement of the second contacting element (23b).

14. Device as in claim 8, which comprises display means (29) to display the extent of the deviation of the maximum radial advance of the second contacting element (23b) with respect to the reference position of the first contacting element (23a).

15. Device as in claim 8, in which the supporting assembly (21) is associated with displacement means (28) for displacement radially with respect to the sprocket wheel (14).

16. Device as in claim 8, in which the contacting elements (23a, 23b) are offset with respect to each other to correspond to a staggering of the teeth (24) of the two toothed rings (27a, 27b).

* * * * *

UNITED STATES PATENT AND TRADEMARK OFFICE
CERTIFICATE OF CORRECTION

PATENT NO. : 6,293,025 B1  
DATED : September 25, 2001  
INVENTOR(S) : Sheridan Ralph Gill It is certified that error appears in the above-identified patent and that said Letters Patent is hereby corrected as shown below:

<u>Title page,</u>
Item [73], Assignee should read as follows: -- Technologies Research Holding S.A. --.

Signed and Sealed this

Eighteenth Day of June, 2002

*Attest:*

*Attesting Officer*

JAMES E. ROGAN
*Director of the United States Patent and Trademark Office*